(12) United States Patent
Kim et al.

(10) Patent No.: US 7,756,211 B2
(45) Date of Patent: Jul. 13, 2010

(54) CHANNEL ESTIMATION METHOD IN A MIMO WIRELESS COMMUNICATION SYSTEM

(75) Inventors: Ji-Hyung Kim, Seoul (KR); Dae-Sik Hong, Seoul (KR); Dong-Jun Lee, Seoul (KR); Jong-Han Kim, Suwon-si (KR); Byung-Jun Park, Seoul (KR); Jong-Ae Park, Yongin-si (KR)

(73) Assignees: Samsung Electronics, Co., Ltd., Suwon-si (KR); Yonsei University, Seoul (KR)

( * ) Notice: Subject to any disclaimer, the term of this patent is extended or adjusted under 35 U.S.C. 154(b) by 794 days.

(21) Appl. No.: 11/219,921

(22) Filed: Sep. 6, 2005

(65) Prior Publication Data

US 2006/0050802 A1      Mar. 9, 2006

(30) Foreign Application Priority Data

Sep. 7, 2004    (KR) ................... 10-2004-0071310

(51) Int. Cl.
    H04B 7/02        (2006.01)
(52) U.S. Cl. ................. 375/267; 370/208; 370/209; 370/210; 375/260; 375/295; 375/302; 375/299; 455/91; 455/101; 455/103
(58) Field of Classification Search ............. 375/260, 375/267, 299, 302; 370/208, 209, 210; 455/99, 455/101
See application file for complete search history.

(56) References Cited

U.S. PATENT DOCUMENTS

| | | | | |
|---|---|---|---|---|
| 7,382,719 | B2* | 6/2008 | Gummadi et al. | 370/208 |
| 2002/0041635 | A1* | 4/2002 | Ma et al. | 375/267 |
| 2003/0072452 | A1 | 4/2003 | Mody et al. | |
| 2004/0141548 | A1* | 7/2004 | Shattil | 375/146 |
| 2005/0233709 | A1* | 10/2005 | Gardner et al. | 455/101 |
| 2006/0008023 | A1* | 1/2006 | Magee et al. | 375/267 |
| 2006/0251193 | A1* | 11/2006 | Kopmeiners et al. | 375/345 |

OTHER PUBLICATIONS

Korean Office Action issued on Apr. 15, 2010, in corresponding Korean Application No. 10/2004-0071310 (3 pages).

* cited by examiner

*Primary Examiner*—Shuwang Liu
*Assistant Examiner*—Dhaval Patel
(74) *Attorney, Agent, or Firm*—NSIP Law

(57) ABSTRACT

A channel estimation method in a Multiple Input Multiple Output (MIMO) mobile communication system having a plurality of transmission antennas and a plurality of reception antennas is provided. In a method of transmitting, by a transmitter, channel estimation signals for channel estimation at a receiver, the transmission antennas transmit the same channel estimation signals for a first frame transmission duration, and transmit predetermined channel estimation signals corresponding to the number of the transmission antennas for a second frame transmission duration.

11 Claims, 6 Drawing Sheets

CHANNEL ESTIMATION METHOD IN A MIMO WIRELESS COMMUNICATION SYSTEM

PRIORITY

This application claims priority under 35 U.S.C. §119 to an application entitled "Channel Estimation Method in MIMO Wireless Communication System" filed in the Korean Intellectual Property Office on Sep. 7, 2004 and assigned Serial No. 2004-71310, the contents of which are incorporated herein by reference.

BACKGROUND OF THE INVENTION

1. Field of the Invention

The present invention relates generally to a wireless communication system using Multiple Input Multiple Output (MIMO) technology (hereinafter referred to as a "MIMO wireless communication system"), and in particular, to a channel estimation method in a MIMO wireless communication system.

2. Description of the Related Art

To provide services having various qualities of services (QoSs) at around a 100 Mbps data rate in $4^{th}$ generation (4G) communication systems, i.e., next generation communication systems, a large amount of research has been performed. In particular, research to support a high-speed data service with guaranteeing mobility and QoS in Broadband Wireless Access (BWA) communication systems, such as Local Area Network (LAN) systems and Metropolitan Area Network (MAN) systems, of the 4G communication systems has been conducted.

In the 4G communication systems, research on multi-antenna schemes has also been performed as an alternative plan to overcome limitation on an allocated bandwidth, i.e., to raise a data rate. The multi-antenna schemes can overcome limitation on frequency-domain bandwidth resources by utilizing a space domain.

For example, a mobile communication system is structured such that a plurality of user equipments communicate with each other via a base station. When the plurality of user equipments communicate with each other via the base station at a high data rate, a fading phenomenon occurs due to characteristics of wireless channels. To overcome the fading phenomenon, a transmission antenna diversity scheme, i.e., one of the multi-antenna schemes, has been suggested. The transmission antenna diversity scheme is used to increase a data rate by minimizing a data transmission loss due to the fading phenomenon by transmitting signals using at least two transmission antennas, i.e., multiple antennas. This transmission antenna diversity scheme will now be described herein below.

The transmission antenna diversity scheme is used to cope with distortion, which is caused by the fading phenomenon, of received transmission signals that have undergone independent fading phenomena in a wireless channel environment. Transmission antenna diversity scheme is classified into a plurality of schemes such as a time diversity scheme, a frequency diversity scheme, a multipath diversity scheme, and a space diversity scheme. That is, a mobile communication system must fully overcome the fading phenomenon, which most seriously affects communication performance, in order to perform high-speed data transmission because amplitude of a received signal is decreased by several dB to tens of dB because of the fading phenomenon.

The time diversity scheme is used to effectively deal with burst errors generated in a wireless channel environment using interleaving and coding technologies, and is generally used in a Doppler spread channel. However, the time diversity scheme has a drawback in that it is difficult to obtain a diversity effect in a low-speed Doppler channel. The space diversity scheme is commonly used in a channel with low delay spread, such as an indoor channel, and a low-speed Doppler channel with low delay spread, such as a pedestrian channel. The space diversity scheme is used to obtain a diversity gain by using at least two antennas. That is, when a signal transmitted from an antenna is attenuated because of a fading phenomenon, the space diversity scheme is used to obtain a diversity gain by receiving signals transmitted from the remaining antennas. The space diversity scheme is classified into a reception antenna diversity scheme utilizing a plurality of reception antennas, a transmission antenna diversity scheme utilizing a plurality of transmission antennas, and a MIMO scheme utilizing a plurality of reception antennas and a plurality of transmission antennas.

In the MIMO scheme, a data rate is increased by using a spatial multiplexing scheme and a space-time coding (STC) scheme. The spatial multiplexing scheme is used to multiplex an information data signal into as many parallel data streams as the number of transmission antennas, and then transmit the data streams through independent paths via the transmission antennas. A Bell Labs Layered Space Time (BLAST) scheme exists as the spatial multiplexing scheme. The use of the spatial multiplexing scheme can increase a data rate in proportion to the number of transmission antennas in a wireless channel environment without additional transmission power and frequency band.

In order to provide services having a variety of QoSs at around a 100 Mbps data rate to users, the Institute of Electrical and Electronics Engineers (IEEE) 802.11n system attempts to establish a next generation Wireless LAN (WLAN) standard. For the IEEE 802.11n system, a task group was organized on May 2003, and research to maintain compatibility with an IEEE 802.11a system, which is a conventional WLAN standard, and add the MIMO technology to the IEEE 802.11a system has been conducted. The IEEE 802.11a system uses Orthogonal Frequency Division Multiplexing (OFDM) technology to realize a data rate with up to a maximum of 54 Mbps. Therefore, the IEEE 802.11n system also can be realized by adding the MIMO technology to the OFDM technology. Hereinafter, a MIMO communication system based on the OFDM technology is called a "MIMO-OFDM system."

The IEEE 802.11n system must perform channel estimation using a preamble used in the IEEE 802.11a system because compatibility between the IEEE 802.11n system and the IEEE 802.11a system must be maintained as described above.

FIG. 1 illustrates a frame of a conventional IEEE 802.11a system. Referring to FIG. 1, the frame can be divided into preamble fields 102 and 104, a signal field 106, and a data frame field (or Physical layer convergence protocol Service Data Unit (PSDU)) 108. The preamble fields 102 and 104 can be classified as a short preamble (SP) field 102 and a long preamble (LP) field 104. In general, the preamble fields 102 and 104 are used for channel estimation, sync acquisition and offset estimation between a user equipment and a base station.

More specifically, the SP field 102 is used for time synchronization and coarse frequency offset estimation, and the LP field 104 is used fine frequency offset estimation and channel estimation. Here, inter-preamble interference can be prevented by inserting a guard interval (GI) 103 between the SP field 102 and the LP field 104. The signal field 106 includes information indicating a length and a data rate of the subsequent PSDU 108.

A plurality of methods have been suggested for applying the preamble structure used in the IEEE 802.11a system illustrated in FIG. 1 to an IEEE 802.11n system. However, there are numerous drawbacks, which have not been solved, in these methods. The preamble design methods suggested considering an IEEE 802.11n system will now be described with reference to FIGS. 2 through 4.

It is noted, however, that although a MIMO-OFDM system having a predetermined number of transmission antennas (Tx Ants) and the same number of reception antennas (Rx Ants) will be described with reference to FIGS. 2 through 4, the description can be applied to any MIMO-OFDM system having at least two Tx/Rx Ants.

FIG. 2 illustrates a preamble structure using a repeating preamble pattern suggested for a conventional IEEE 802.11n system. Referring to FIG. 2, a signal having the same pattern as the preamble structure of the preamble fields 102 and 104 and the signal field 106 illustrated in FIG. 1 is transmitted from a first Tx Ant of a 3×3 MIMO-OFDM system for a frame duration 202. However, unlike the frame structure of FIG. 1, a second signal field 204 follows the frame duration 202. The second signal field 204 includes information for enabling a receiver to identify whether the 3×3 MIMO-OFDM system uses the MIMO technology or Single Input Single Output (SISO) technology. An LP including a GI is transmitted from a second Tx Ant to a receiver for a frame duration 206. Accordingly, the LP is transmitted from a third Tx Ant to the receiver for a frame duration 208. Data is transmitted from the first, second, and third Tx Ants to the receiver after the frame duration 208.

As described above, a MIMO-OFDM system having a repeating LP transmission structure is efficient in terms of performance. However, the MIMO-OFDM system needs to transmit as many LPs as the number of Tx Ants and the transmission of the LPs accompanies overhead. That is, an increase in number of antennas linearly increases the overhead.

FIG. 3 illustrates a preamble structure using the diagonal loaded preamble pattern suggested for a conventional IEEE 802.11n system. Referring to FIG. 3, the same preamble is transmitted from first, second, and third Tx Ants of a 3×3 MIMO-OFDM system. Therefore, overhead required to transmit an LP for each Tx Ant does not exist. However, because the LP is simultaneously transmitted from the three Tx Ants, pilots transmitted from the three Tx Ants must be identified to perform channel estimation for each Tx Ant. Additionally, pilot spacing must be separated according to the number of Tx Ants.

For example, if the number of Tx Ants is 4, a pilot signal transmitted from a first Tx Ant must be transmitted at time T0, T4, T8, . . . , a pilot signal transmitted from a second Tx Ant must be transmitted at time T1, T5, T9, . . . , a pilot signal transmitted from a third Tx Ant must be transmitted at time T2, T6, T10, . . . , and a pilot signal transmitted from a fourth Tx Ant must be transmitted at time T3, T7, T11, . . . Therefore, a receiver performs channel estimation by performing interpolations according to the pilot spacing. Accordingly, an increase in number of Tx Ants increases an interpolation frame duration, causing deterioration in channel estimation performance.

FIG. 4 illustrates a Hadamard preamble structure suggested for a conventional IEEE 802.11n system. More specifically, FIG. 4 illustrates a Hadamard preamble structure suggested for a conventional IEEE 802.11n system.

Referring to FIG. 4, a portion of a frame transmitted from a first Tx Ant of a 4×4 MIMO-OFDM system for a frame duration 402 is configured by adding the same second signal field as the second signal field 204 of FIG. 2 to the preambles 102, 104, and 106, before the PSDU 108 of the IEEE 802.11a system of FIG. 1. LPs transmitted from first, second, third, and fourth Tx Ants for a frame duration 404 are configured to be orthogonal to each other as illustrated in FIG. 4, and data frames are transmitted from the first, second, third and fourth Tx Ants to a receiver. Here, in the frame duration 404, 4 LPs are configured per Tx Ant. Because the number of Tx Ants is 4, 4 LPs are configured per Tx Ant to perform channel estimation according to Tx Ant. However, if the number of Tx Ants is 5, the number of LPs for each Tx Ant in the frame duration 404 is 5. Therefore, in a MIMO-OFDM system using the Hadamard method, the number of additional preambles is increased along with an increase in number of Tx Ants.

As described above, an IEEE 802.11n communication system is used in a MIMO-OFDM communication system in which the MIMO technology is added to the OFDM technology. Also, the IEEE 802.11n communication system uses preambles of conventional IEEE 802.11 communication systems. Further, the IEEE 802.11n communication system can maintain compatibility with the IEEE 802.11 communication systems by using the same preambles. Accordingly, preamble structures suggested for the IEEE 802.11n communication system are slightly modified while maintaining a preamble structure of the IEEE 802.11a standard.

In the suggested preamble structures, an increase in channel estimation performance increases overhead. On the contrary, a decrease in overhead decreases the channel estimation performance. Therefore, in order to solve the problems of the conventional preamble structures, a new preamble structure is needed, which is capable of improving its channel estimation performance and reducing overhead.

SUMMARY OF THE INVENTION

The present invention has been designed to substantially solve at least the above problems and/or disadvantages and to provide at least the advantages below. Accordingly, an object of the present invention is to provide a preamble design method for improving channel estimation performance in an IEEE 802.11n wireless communication system.

Another object of the present invention is to provide a preamble design method for maintaining compatibility with conventional IEEE 802.11 wireless communication systems in an IEEE 802.11n wireless communication system.

According to one aspect of the present invention, there is provided a method of transmitting, by a transmitter, channel estimation signals for channel estimation at a receiver in a Multiple Input Multiple Output (MIMO) mobile communication system having a plurality of transmission antennas and a plurality of reception antennas. The transmission antennas transmit the same channel estimation signals for a first frame transmission duration. The method further includes transmitting predetermined channel estimation signals corresponding to the number of the transmission antennas for a second frame transmission duration.

According to another aspect of the present invention, there is provided a method of performing channel estimation in a receiver in a Multiple Input Multiple Output (MIMO) mobile communication system having a plurality of transmission antennas and a plurality of reception antennas. The method includes the steps of receiving, from the transmission antennas, the same channel estimation signals for a first frame transmission duration, and predetermined channel estimation signals corresponding to the number of the transmission antennas for a second frame transmission duration; classifying the channel estimation signals received for the first frame transmission duration and the channel estimation signals received for the second frame transmission duration according to transmission antenna; and performing channel estimation on sub-carriers in which reference signals are inserted.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

Figure 1:
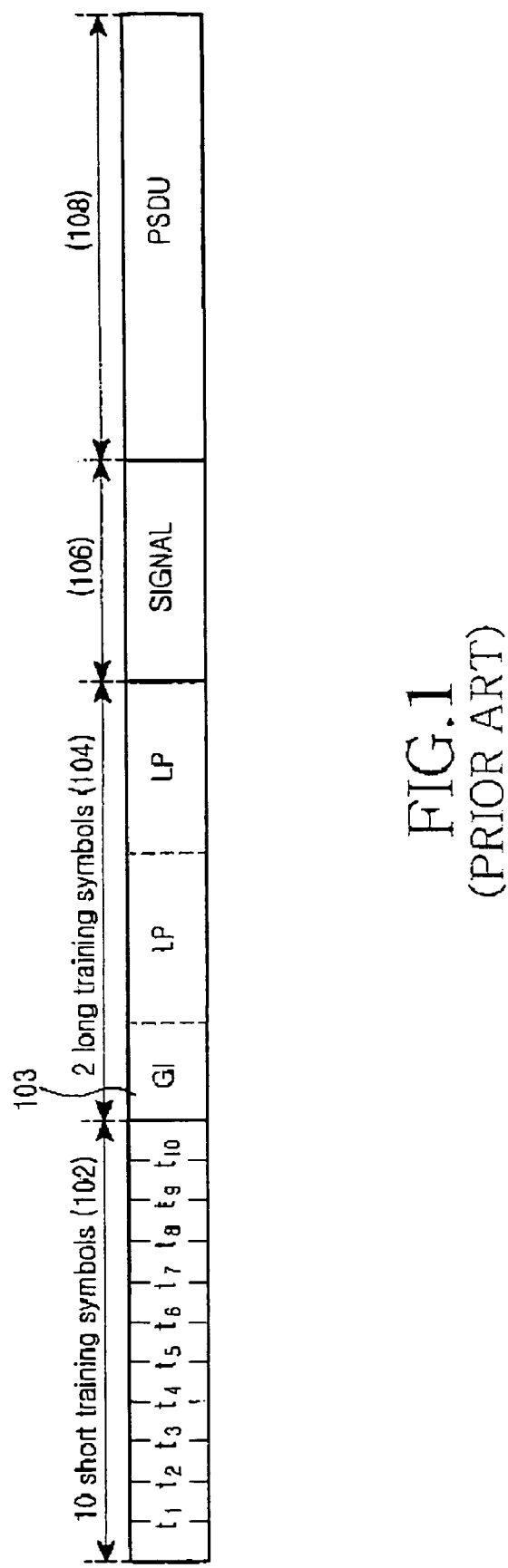
FIG. 1 illustrates a frame of a conventional IEEE 802.11a system.

Preferred embodiments of the present invention will be described in detail herein below with reference to the accompanying drawings. In the following description, well-known functions or constructions are not described in detail because they would obscure the invention in unnecessary detail.

In the present invention, a preamble structure for efficient channel estimation in an Institute of Electrical and Electronics Engineers (IEEE) 802.11n wireless communication system is suggested. In particular, the present invention suggests a preamble structure having higher channel estimation performance and less overhead as compared with the preamble structures already suggested for the IEEE 802.11n wireless communication system. Hereinafter, the preamble structure suggested in the present invention is called a "hybrid preamble."

As indicated above, the IEEE 802.11n wireless communication system is directed to a Multiple Input Multiple Output (MIMO) wireless communication system based on Orthogonal Frequency Division Multiplexing (OFDM) technology. The MIMO wireless communication system based on the OFDM technology (hereinafter referred to as a "MIMO-OFDM wireless communication system") uses a preamble in which a preamble pattern of conventional IEEE 802.11 wireless communication systems is maintained in order to maintain compatibility with the IEEE 802.11 wireless communication systems.

In general, the preamble means a frame existing before a data frame and is used for channel estimation, sync acquisition, and offset estimation between a user equipment and a base station. More specifically, the preamble can be classified into a short preamble (SP) and long preambles (LPs), wherein the SP is used for time synchronization and coarse frequency offset estimation and the LPs are used for fine frequency offset estimation and channel estimation. Inter-preamble interference can be prevented by inserting a guide interval (GI) between an SP field and an LP field. Besides the SP and the LPs, there exists a signal field in the preamble.

Therefore, in the present invention, an LP structure that enables improvement of channel estimation performance with little overhead is suggested, and a channel estimation method using the suggested LP structure will be described on the basis of a 4×4 MIMO-OFDM wireless communication system.

A hybrid preamble structure suggested in the present invention is configured by adding two pilot symbols (when the number of Tx Ants is 4) to a preamble of the IEEE 802.11a standard for each Tx Ant. Based on time, in a case of first pilot symbols, pilots are inserted into all of sub-carriers, and in a case of second pilot symbols, pilots are inserted into odd-numbered sub-carriers for first and third Tx Ants and into even-numbered sub-carriers for second and fourth Tx Ants. Therefore, a receiver performs channel estimation on the odd-numbered sub-carriers based on signals transmitted from the first and third Tx Ants and channel estimation on the even-numbered sub-carriers based on signals transmitted from the second and fourth Tx Ants. After performing channel estimation on the odd-numbered and even-numbered sub-carriers, the receiver finishes the channel estimation on all of the sub-carriers by performing interpolation. The description above will be summarized as follows:

1. In the IEEE 802.11n wireless communication system, LPs are designed to be similar to the preamble structure of the IEEE 802.11a standard in order to maintain compatibility with the IEEE 802.11 wireless communication system.

2. LPs for channel estimation on odd-numbered or even-numbered sub-carriers are designed. That is, for some of pilot symbols determined according to the number of Tx Ants, pilots are inserted into only the odd-numbered or even-numbered sub-carriers, and for the remaining pilot symbols, pilots are inserted into all of sub-carriers.

3. Because an LP of the IEEE 802.11a standard is configured with two same pilot symbols, channel estimation is performed using each pilot symbol, and accuracy of the channel estimation is increased by using a mean of channel estimation values.

Figure 2:
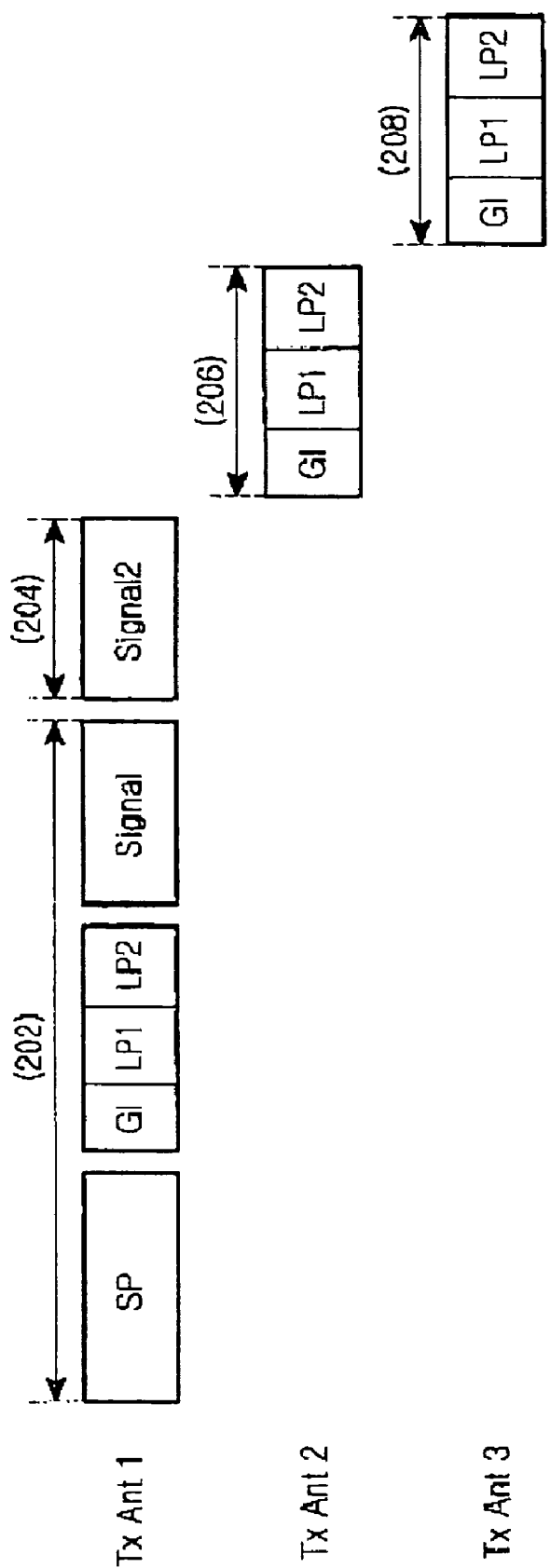
FIG. 2 illustrates a preamble structure using a repeating preamble pattern suggested for a conventional IEEE 802.11n system.
Figure 3:
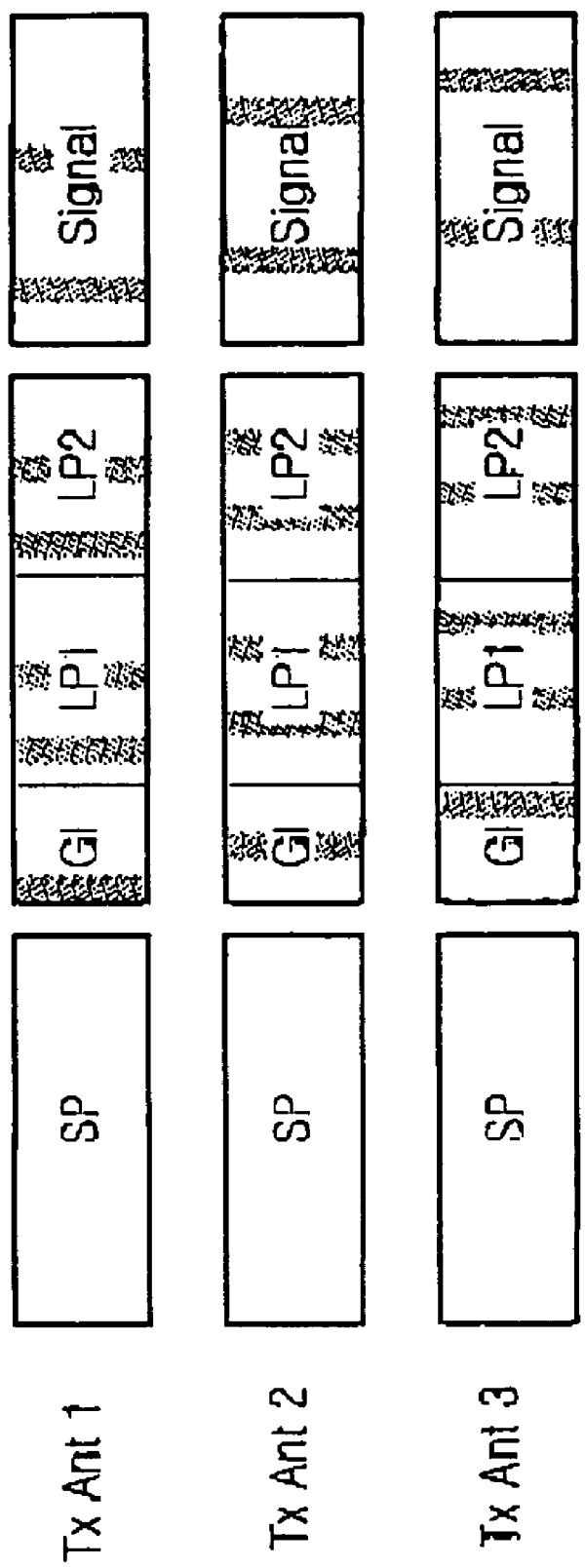
FIG. 3 illustrates a preamble structure using a diagonal loaded preamble pattern suggested for a conventional IEEE 802.11n system.
Figure 4:
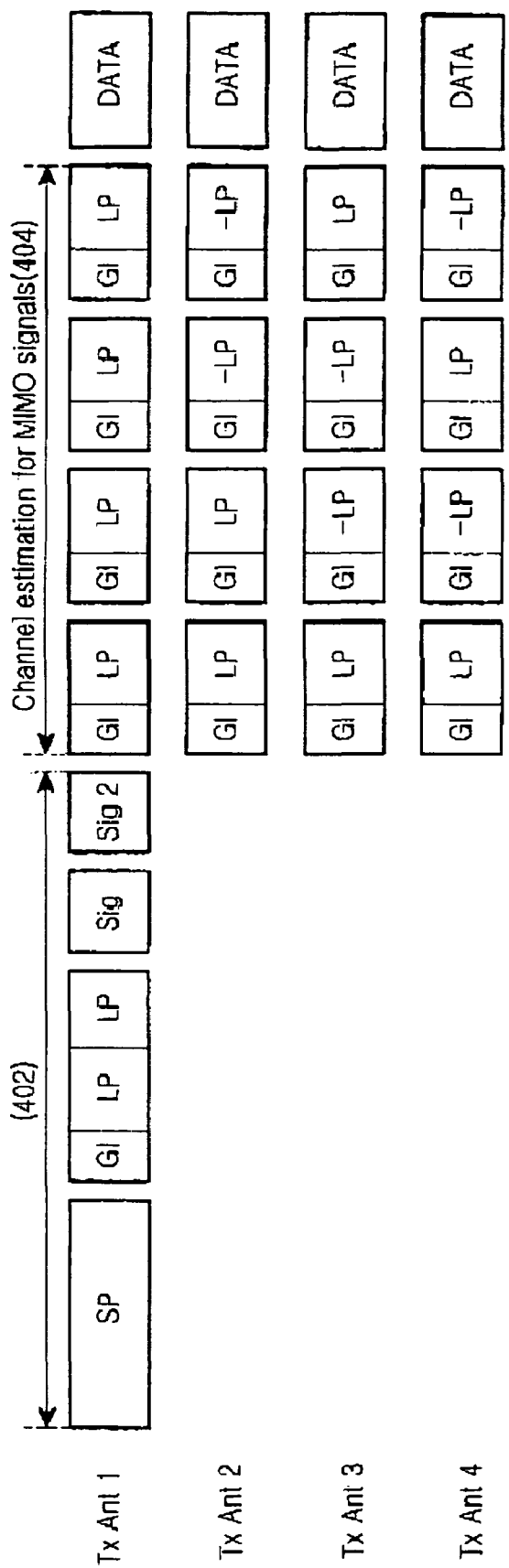
FIG. 4 illustrates a Hadamard preamble structure suggested for a conventional IEEE 802.11n system.
Figure 5:
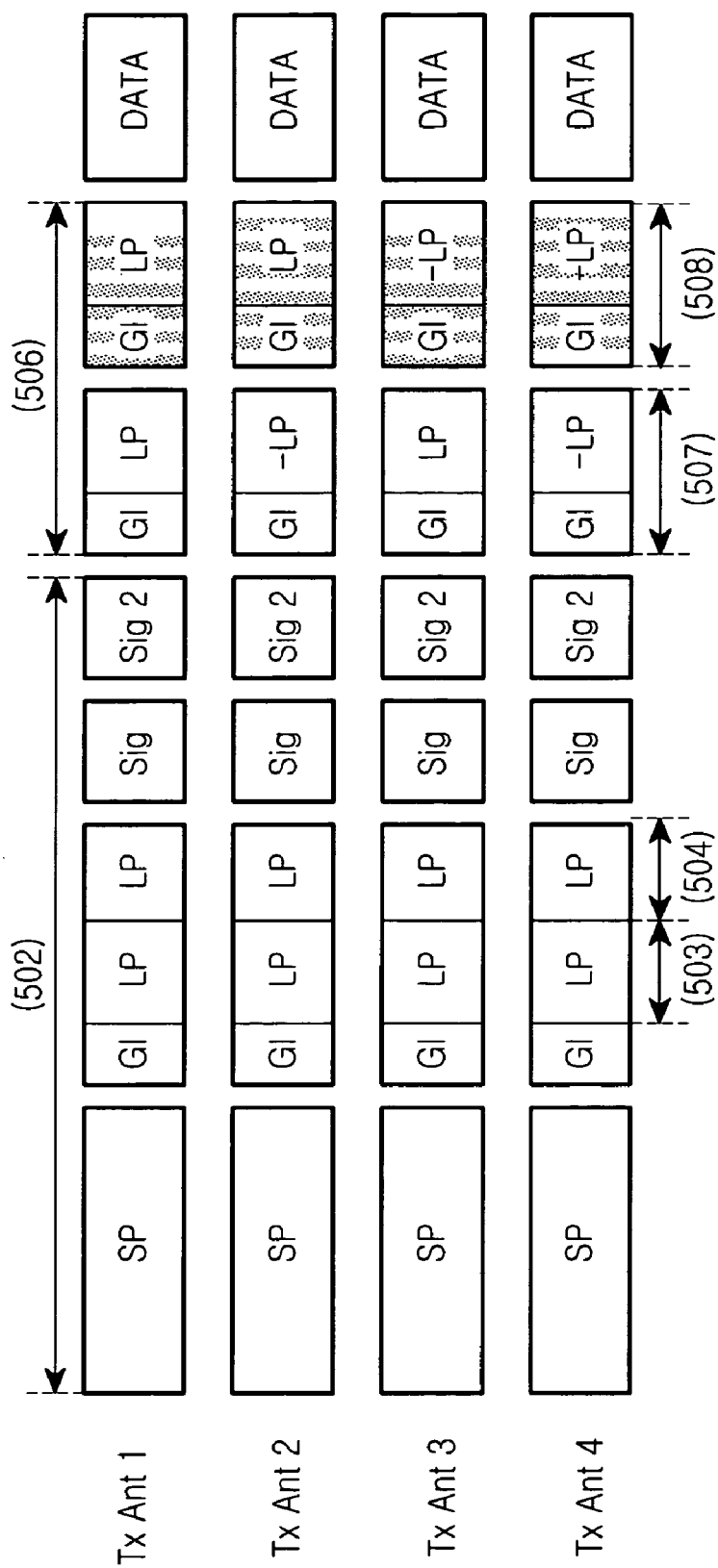
FIG. 5 illustrates a hybrid preamble structure in a 4×4 MIMO-OFDM wireless communication system according to a preferred embodiment of the present invention.

FIG. 5 illustrates the hybrid preamble structure in the 4×4 MIMO-OFDM wireless communication system according to a preferred embodiment of the present invention. Referring to FIG. 5, the hybrid preamble has the same pattern in a frame duration 502 as the frame durations 202 and 204 as illustrated in FIG. 2. The hybrid preamble includes two pilot symbols 507 and 508 in a frame duration 506. Therefore, the hybrid preamble includes four LPs altogether.

By analyzing the four LPs based on time, it is assumed that a first pilot symbol 503 of the four LPs is transmitted for a first symbol time, a second pilot symbol 504 of the four LPs is transmitted for a second symbol time, the third pilot symbol 507 of the four LPs is transmitted for a third symbol time, and the fourth pilot symbol 508 of the four LPs is transmitted for a fourth symbol time.

Accordingly, a pilot $X_{i,2k}^m$ denotes a $2k^{th}$ sub-carrier $$\left(0 \le k \le \frac{K}{2} - 2\right)$$

for an $i^{th}$ time ($1 \le i \le 4$) in an $m^{th}$ Tx Ant ($1 \le m \le 4$). Here, K is the total number of sub-carriers and a pair of $X_{1,2k}^1$ and $X_{1,2k+1}{}^1$ and a pair of $X_{2,2k}{}^2$ and $X_{2,2k+1}{}^2$ are the same pilots as the LPs of the IEEE 802.11a standard, respectively. Therefore, the LPs 503, 504, 507, and 508 included in the frame durations 502 and 506, i.e., pilots according to the present embodiment, can be represented by Equation (1).

$$X_{1,j}{}^1 = X_{1,j}{}^2 = X_{1,j}{}^3 = X_{1,j}{}^4 \quad (0 \leq j \leq K-1)$$

$$X_{1,j}{}^1 = X_{2,j}{}^1 = X_{2,j}{}^2 = X_{2,j}{}^3 = X_{2,j}{}^4$$

$$X_{1,j}{}^1 X_{3,j}{}^1 = -X_{3,j}{}^2 = X_{3,j}{}^3 = -X_{3,j}{}^4 \quad (1)$$

Referring to Equation (1), all of the pilot symbols transmitted from their associated Tx Ants for the frame duration 503, i.e., the first symbol time, are the same pilot signals. Also, all of pilot symbols transmitted from their associated Tx Ants for the frame duration 504, i.e., the second symbol time, are the same pilot signals. Accordingly, the pilot symbols for the frame duration 503 are equal to the pilot symbols for the frame duration 504.

Additionally, a pilot symbol transmitted from the first Tx Ant for the first symbol time is equal to pilot symbols transmitted from the first and third Tx Ants for the third symbol time. Also, the pilot symbol transmitted from the first Tx Ant for the first symbol time is equal to a pilot symbol transmitted from the second Tx Ant for the third symbol time and a pilot symbol transmitted from the fourth Tx Ant for the third symbol time but has a phase difference of 180°.

Equation (2) represents that the odd-numbered or even-numbered sub-carriers are separately transmitted from the associated Tx Ants.

$$X_{1,2k}^1 = \frac{1}{\sqrt{2}} X_{4,2k}^1 = -\frac{1}{\sqrt{2}} X_{4,2k}^3 \quad (2)$$

$$X_{1,2k+1}^1 = \frac{1}{\sqrt{2}} X_{4,2k+1}^2 = -\frac{1}{\sqrt{2}} X_{4,2k+1}^4$$

Referring to Equation (2), pilots inserted in the even-numbered sub-carriers are transmitted from the first and third Tx Ants for the fourth symbol time, and pilots carried on the odd-numbered sub-carriers are transmitted from the second and fourth Tx Ants for the fourth symbol time. Here, the pilots transmitted for the fourth symbol time are multiplied by $$\frac{1}{\sqrt{2}}$$

for power normalization on OFDM symbols.

An LP sequence of the conventional IEEE 802.11a standard is represented by Equation (3).

$$\{0, 1, -1, -1, 1, 1, -1, 1, -1, 1, -1, -1, -1, -1, -1, 1,$$
$$1, -1, -1, 1, -1, 1, -1, 1, 1, 1, 1, 0, 0, 0, 0, 0, 0, 0, 0,$$
$$0, 0, 0, 1, 1, -1, -1, 1, 1, -1, 1, -1, 1, 1, 1, 1, 1, 1,$$
$$-1, -1, 1, 1, -1, 1, -1, 1, 1, 1, 1,\} \quad (3)$$

That is, Equation (3) is an example of a 64-point OFDM symbol. Also, all of the pilot symbols for the frame duration 503, all of the pilot symbols for the frame duration 504, and the pilot symbols transmitted from the first and third Tx Ants for the frame duration 507 have sequences having the pattern shown in Equation 3.

Therefore, referring to Equations (2) and (3), the sequences of the pilot symbols are represented below by Equations (4) through (6).

$$X_{3,0-63}^2 = X_{3,0-63}^4 = \begin{cases} \{0, -1, 1, 1, -1, -1, 1, -1, 1, -1, 1, 1, 1, \\ 1, 1, -1, -1, 1, 1, -1, 1, -1, 1, -1, -1, -1, \\ -1, 0, 0, 0, 0, 0, 0, 0, 0, 0, 0, 0, -1, -1, \\ 1, 1, -1, -1, 1, -1, 1, -1, -1, -1, -1, -1, -1, \\ 1, 1, -1, -1, 1, -1, 1-1, -1, -1, -1\} \end{cases} \quad (4)$$

$$X_{4,0-63}^1 = \quad (5)$$
$$-X_{4,0-63}^3 = \sqrt{2} \times \{0, 0, -1, 0, 1, 0, -1, 0, -1, 0, -1, 0, -1, 0,$$
$$-1, 0, 1, 0, -1, 0, -1, 0, -1, 0, 1, 0, 1, 0, 0, 0,$$
$$0, 0, 0, 0, 0, 0, 0, 0, 1, 0, -1, 0, 1, 0, -1, 0, -1,$$
$$0, 1, 0, 1, 0, 1, 0, -1, 0, 1, 0, 1, 0, 1, 0, 1, 0\},$$

$$X_{4,0-63}^2 = -X_{4,0-63}^4 = \quad (6)$$
$$\sqrt{2} \times \begin{cases} \{0, 1, 0, -1, 0, 1, 0, 1, 0, 1, 0, -1, 0, -1, 0, \\ 1, 0, -1, 0, 1, 0, 1, 0, 1, 0, 1, 0, 0, \\ 0, 0, 0, 0, 0, 0, 0, 0, 0, 0, 1, 0, -1, 0, 1, 0, 1, \\ 0, 1, 0, -1, 0, 1, 0, -1, 0, -1, 0, 1, 0, 1\} \end{cases}$$

When hybrid preambles described above are transmitted from the associated Tx Ants, a receiver receives signals including the hybrid preambles shown in Equations (7) through (11).

$$Y_{1,j} = X_{1,j}{}^1(H_j^1 + H_j^2 + H_j^3 + H_j^4) + W_{1,j} (0 \leq j \leq K-1) | \quad (7)$$

$$Y_{2,j} = X_{1,j}{}^1(H_j^1 + H_j^2 + H_j^3 + H_j^4) + W_{2,j} | \quad (8)$$

$$Y_{3,j} = X_{1,j}{}^1(H_j^1 - H_j^2 + H_j^3 - H_j^4) + W_{3,j} | \quad (9)$$

$$Y_{4,2k} = \sqrt{2} X_{1,2k}{}^1(H_{2k}{}^1 - H_{2k}{}^3) + W_{4,2k} | \quad (10)$$

$$Y_{4,2k+1} = \sqrt{2} X_{1,2k+1}{}^1(H_{2k+1}{}^2 - H_{2k+1}{}^4) + W_{4,2k+1} \quad (11)$$

In Equations (7) through (11), $Y_{i,j}$ denotes a reception signal of a $j^{th}$ sub-carrier for an $i^{th}$ time and $H_j^m$ denotes a channel response to the $j^{th}$ sub-carrier from an $m^{th}$ Tx Ant. $W_{i,j}$ denotes a noise component of the $j^{th}$ sub-carrier for the $i^{th}$ time. That is, the noise component is an additive white Gaussian noise (AWGN) component whose mean value is 0 and whose variance is $\sigma_W^2$.

The receiver performs channel estimation on signals transmitted from the first and third Tx Ants using the received signals, i.e., Equations (7), (9), and (10) among Equations (7) through (11), as shown in Equation (12) below.

$$\tilde{H}_{2k}^1 = \frac{1}{4X_{1,2k}^1}(Y_{1,2k} + Y_{3,2k} + \sqrt{2} Y_{4,2k}), \quad (12)$$

$$\tilde{H}_{2k}^3 = \frac{1}{4X_{1,2k}^1}(Y_{1,2k} + Y_{3,2k} - \sqrt{2} Y_{4,2k})$$

The receiver performs the channel estimation on the signals transmitted from the first and the third Tx Ants using Equations (8), (9), and (10) in the same way. If channels estimated as the results of the channel estimations are $\tilde{H}_{2k}^1$ and $\tilde{H}_{2k}^3$, respectively, accuracy of the channel estimations can be increased by obtaining mean values of Equation 12 and $\tilde{H}_{2k}^1$ and $\tilde{H}_{2k}^3$, respectively. Final equations used to perform the channel estimation according to the signals transmitted from the first and third Tx Ants are shown in Equation (13).

$$\hat{H}_{2k}^1 = \frac{1}{2}\left(\tilde{H}_{2k}^1 + \breve{H}_{2k}^1\right), \hat{H}_{2k}^3 = \frac{1}{2}\left(\tilde{H}_{2k}^3 + \breve{H}_{2k}^3\right) \quad (13)$$

Referring to Equation (13), pilots are inserted in the even-numbered sub-carriers and transmitted form the first and third Tx Ants for the fourth symbol time. Also, because the LP of the first symbol time is equal to the LP of the second symbol time, two channel estimations can be performed for the same Tx Ants.

It will now be described that the receiver performs channel estimation on signals transmitted from the second and fourth Tx Ants.

The channel estimation on the signals transmitted from the second and fourth Tx Ants is performed using Equations (7), (10), and (11). Channels estimated using Equations (7), (10), and (11) are shown in Equation (14).

$$\tilde{H}_{2k+1}^2 = \frac{1}{4X_{1,2k+1}^1}\left(Y_{1,2k+1} - Y_{3,2k+1} + \sqrt{2}\,Y_{4,2k+1}\right), \quad (14)$$

$$\tilde{H}_{2k+1}^4 = \frac{1}{4X_{1,2k+1}^1}\left(Y_{1,2k+1} - Y_{3,2k+1} - \sqrt{2}\,Y_{4,2k+1}\right)$$

Also, the channel estimation on the signals transmitted from the second and fourth Tx Ants is performed using Equations (8), (10), and (11) in the same way. If channels estimated as the results of the channel estimations are $\breve{H}_{2k+1}^2$ and $\breve{H}_{2k+1}^4$, respectively, accuracy of the channel estimations can be increased by obtaining mean values of Equation (14) and $\breve{H}_{2k+1}^2$ and $\breve{H}_{2k+1}^4$, respectively. Final equations used to perform the channel estimation according to the signals transmitted from the second and fourth Tx Ants are shown in Equation (15).

$$\hat{H}_{2k+1}^2 = \frac{1}{2}\left(\tilde{H}_{2k+1}^2 + \breve{H}_{2k+1}^2\right), \hat{H}_{2k+1}^4 = \frac{1}{2}\left(\tilde{H}_{2k+1}^4 + \breve{H}_{2k+1}^4\right) \quad (15)$$

Finally, channel estimation on sub-carriers in which pilot are not inserted is performed using linear interpolation. That is, $\hat{H}_{2k+1}^1, \hat{H}_{2k}^2, \hat{H}_{2k+1}^3$ and $\hat{H}_{2k}^4$ can be represented by Equation (16).

$$\hat{H}_{2l+1}^m = \frac{1}{2}\left(\hat{H}_{2l}^m + \hat{H}_{2l+2}^m\right) \quad (16)$$

$$\hat{H}_{2l}^m = \frac{1}{2}\left(\hat{H}_{2l-1}^m + \hat{H}_{2l+1}^m\right)$$

Channel estimation on total sub-carriers can be performed by performing the channel estimation using Equations (13) and (15) and performing the channel estimation using the linear interpolation shown in Equation (16) for the remaining sub-carriers.

In this embodiment, only the LP for the frame duration 507 of FIG. 5 is added to a hybrid preamble structure in a 2×2 MIMO-OFDM wireless communication system. That is, because the number of Tx Ants is 2, only one LP is added to the hybrid preamble structure. Also, a preamble equal to the LP for the frame duration 503 or 504 is transmitted from a first Tx Ant, and a preamble equal to the LP for the frame duration 503 or 504 but having a phase difference of 180° is transmitted from a second Tx Ant.

In an alternative embodiment, a hybrid preamble structure in a 3×3 MIMO-OFDM wireless communication system is equal to the hybrid preamble structure illustrated in FIG. 5 but frames corresponding to the fourth Tx Ant are not transmitted. As described above, the present invention can be applied not only to MIMO-OFDM wireless communication systems having a specified number of Tx/Rx Ants, but also to MIMO-OFDM wireless communication systems having a different number of Tx/Rx Ants.

The hybrid preamble according to the embodiments of the present invention will now be compared and analyzed with preambles suggested for conventional IEEE 802.11n systems with reference to Table 1.

TABLE 1

| | Repeating preamble | Diagonal loaded preamble | Hadamard preamble | Hybrid preamble |
|---|---|---|---|---|
| Overhead | 6 | 0 | 4 | 2 (Less overhead) |
| Complexity | — | Linear interpolation | — | Linear interpolation (similar complexity) |
| Performance | $\frac{1}{2-\text{SNR}}$ | $(-) > \frac{1}{2-\text{SNR}}$ | $\frac{1}{\text{SNR}}$ | $(-) < \frac{1}{2-\text{SNR}}$ (good performance) |

Referring to Table 1, a least square (LS) algorithm is used as a channel estimation algorithm in a 4×4 MIMO-OFDM wireless communication system, overhead denotes the number of added pilots as compared with the IEEE 802.11a standard, and a mean square error (MSE) method is used for performance measurement. As shown in Table 1, the hybrid preamble according to the embodiments of the present invention has less overhead and better performance than the conventional preambles.

Figure 6:
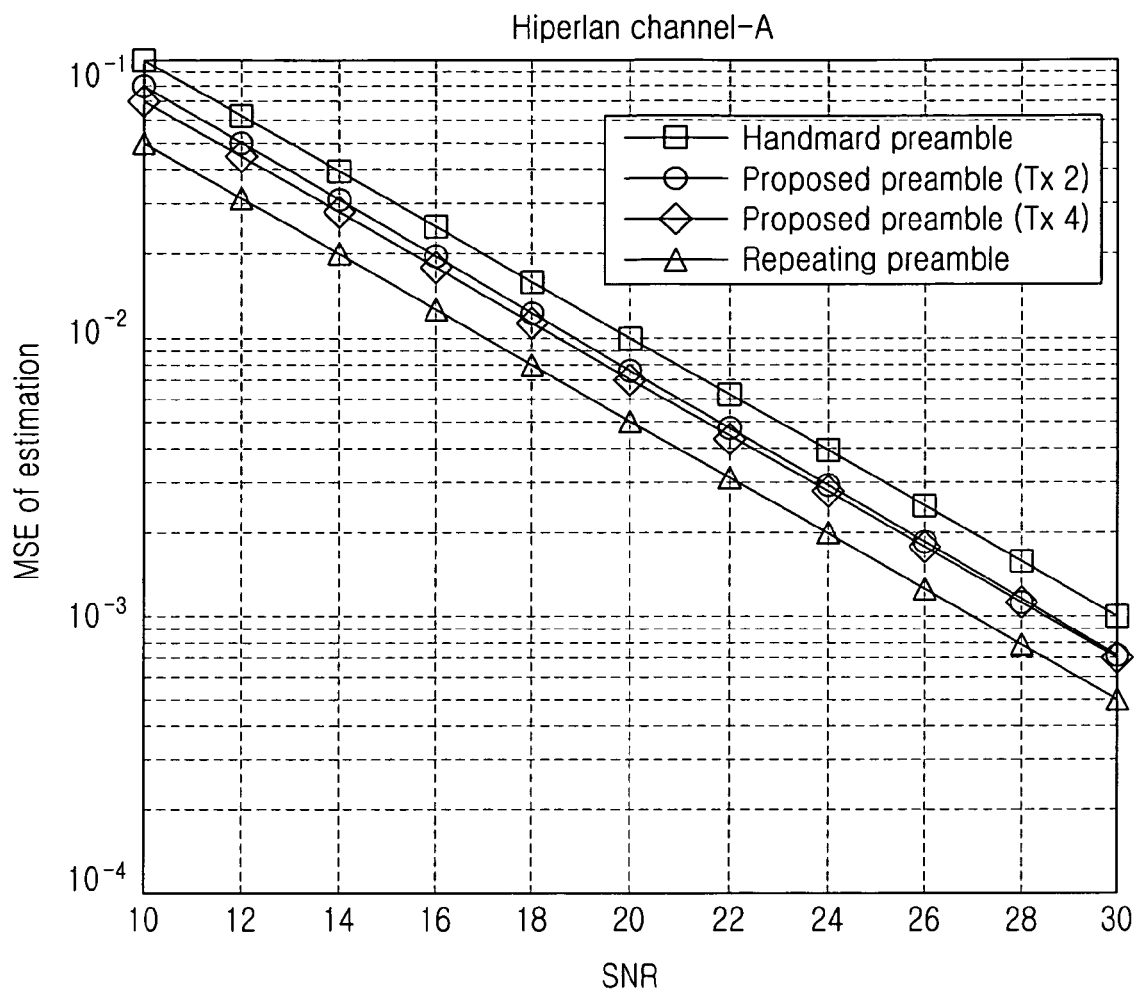
FIG. 6 is a graph illustrating results of a simulation performed to measure performance of conventional preambles and hybrid preambles according to a preferred embodiment of the present invention.

FIG. 6 is a graph illustrating results of a simulation performed to measure performance of conventional preambles and hybrid preambles according to a preferred embodiment of the present invention. Referring to FIG. 6, the HIPERLAN (High Performance Radio Local Area Network) channel-A, i.e., one of the WLAN standards, is selected as a simulation environment, and it is assumed that each antenna has an independent channel environment. As illustrated in FIG. 6, compared with a repeating preamble, the hybrid preambles according to the present invention have a little bit worse performance in terms of channel estimation performance, however, have less overhead, and compared with a Hadamard preamble, the hybrid preambles have better channel estimation performance.

As described above, when a preamble structure newly suggested in the present invention is applied to an IEEE 802.11n communication system, compatibility with conventional IEEE 802.11 communication systems can be maintained. Also, compared with a preamble structure for conventional IEEE 802.11n communication systems, the preamble structure newly suggested in the present invention properly satisfies both performance and overhead While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A method of transmitting, by a transmitter, channel estimation signals for channel estimation at a receiver in a Multiple Input Multiple Output (MIMO) mobile communication system having a plurality of transmission antennas and a plurality of reception antennas, the method comprising:
   transmitting identical channel estimation signals by each of the transmission antennas of the transmitter for a first frame transmission duration;
   transmitting, by odd-numbered transmission antennas, a first channel estimation signal for a second frame transmission duration equal to the channel estimation signal transmitted for the first frame transmission duration; and
   transmitting, by even-numbered transmission antennas, a second channel estimation signal for the second frame transmission duration having a phase difference of $\pi$ from the channel estimation signal transmitted for the first frame transmission duration.

2. The method of claim 1, wherein when the number of the plurality of transmission antennas is at least equal to 3, the channel estimation signals transmitted for the second frame transmission duration include channel estimation signals having a phase difference of $\pi$ for the transmission antennas and channel estimation signals in which a reference signal is inserted in at least one of odd-numbered and even-numbered sub-carriers for the plurality of transmission antennas.

3. The method of claim 2, wherein the number of the plurality of transmission antennas is 4.

4. The method of claim 2, wherein, for the second frame transmission duration, the odd-numbered transmission antennas transmit a third channel estimation signal in which a reference signal is inserted in the even-numbered sub-carriers, and even-numbered transmission antennas transmit a fourth channel estimation signal in which the reference signal is inserted in odd-numbered sub-carriers.

5. The method of claim 1, wherein the channel estimation signals comprise pilot signals such that:
   transmitting identical channel estimation signals comprises transmitting identical pilot signals during the first frame transmission duration; and
   transmitting predetermined channel estimation signals comprises transmitting predetermined pilot signals corresponding to a number of the plurality of transmission antennas for the second frame transmission duration.

6. The method of claim 5, further comprising adding pilot symbols to sub-carriers to produce the pilot signals.

7. A method of performing channel estimation in a receiver in a Multiple Input Multiple Output (MIMO) mobile communication system having a plurality of transmission antennas and a plurality of reception antennas, the method comprising:
   receiving, from each of the transmission antennas of a transmitter, identical channel estimation signals for a first frame transmission duration and predetermined channel estimation signals corresponding to a number of the plurality of transmission antennas for a second frame transmission duration;
   classifying the channel estimation signals received for the first frame transmission duration and the channel estimation signals received for the second frame transmission duration according to transmission antenna; and
   performing channel estimation on sub-carriers in which reference signals are inserted,
   wherein odd-numbered transmission antennas transmit a first channel estimation signal for the second frame transmission duration equal to the channel estimation signal transmitted for the first frame transmission duration, and even-numbed transmission antennas transmit a second channel estimation signal for the second frame transmission duration having a phase difference of it from the channel estimation signal transmitted for the first frame transmission duration.

8. The method of claim 7, further comprising performing channel estimation on sub-carriers in which no reference signal is inserted using linear interpolation.

9. The method of claim 7, wherein when the number of the plurality of transmission antennas is at least equal to 3, the channel estimation signals transmitted for the second frame transmission duration include channel estimation signals having a phase difference of $\pi$ for the transmission antennas and channel estimation signals in which a reference signal is inserted in at least one of odd-numbered and even-numbered sub-carriers for the transmission antennas.

10. The method of claim 9, wherein the number of the plurality of transmission antennas is 4.

11. The method of claim 9, wherein, for the second frame transmission duration, the receiver receives a third channel estimation signal, in which a reference signal is inserted in even-numbered sub-carriers, transmitted from the odd-numbered transmission antennas and receives a fourth channel estimation signal, in which the reference signal is inserted in odd-numbered sub-carriers, transmitted from the even-numbered transmission antennas.

* * * * *